United States Patent [19]

Smith

[11] Patent Number: 4,469,273
[45] Date of Patent: Sep. 4, 1984

[54] SELF-UNLOCKING CONTAINER CLOSURE

[75] Inventor: Leroy D. Smith, Corning, N.Y.

[73] Assignee: Weyerhaeuser Company, Tacoma, Wash.

[21] Appl. No.: 500,476

[22] Filed: Jun. 2, 1983

[51] Int. Cl.³ .............................................. B65D 5/68
[52] U.S. Cl. ................................. 229/43; 229/23 BT; 229/34 R; 229/41 R
[58] Field of Search .................... 229/30, 31 R, 31 FS, 229/33, 34 R, 34 A, 34 B, 34 HW, 36, 23 BT, 41 R, 41 B, 43

[56] References Cited

U.S. PATENT DOCUMENTS

| | | | |
|---|---|---|---|
| 530,334 | 12/1894 | Goettsch | 229/34 R |
| 2,707,587 | 5/1955 | Wittstein | 229/33 X |
| 2,718,998 | 9/1955 | Bemiss | 229/35 |
| 2,809,775 | 10/1957 | White | 229/34 R |
| 3,252,648 | 5/1966 | Johnson | 229/34 R |
| 3,580,475 | 5/1971 | Mobley | 229/34 R |
| 3,904,105 | 9/1975 | Booth | 229/15 |

FOREIGN PATENT DOCUMENTS 762,926 4/1934 France ............................... 229/34 R
834482 5/1960 United Kingdom ............. 229/34 R Primary Examiner—William Price
Assistant Examiner—Gary E. Elkins

[57] ABSTRACT

A reusable container closure which telescopes over the open top or bottom of the container. The closure side walls have locking flaps at each end. The closure end walls wrap around the locking flaps to hold the closure side and end walls in upright position. Temporary locking elements bear against the inner face of the inner end wall and hold the end and side walls in position. The temporary locking elements are formed from and hinged to at least one of the central or side panels and are bent from the planes of these panels to hold the side and end panels in place. When the closure is telescoped over the container, the container pushes the locking elements back into the plane of the panels and the container now holds the side and end panels in place. When the closure is removed the side and end panels are no longer held in place and may be flattened for reuse easily.

4 Claims, 17 Drawing Figures

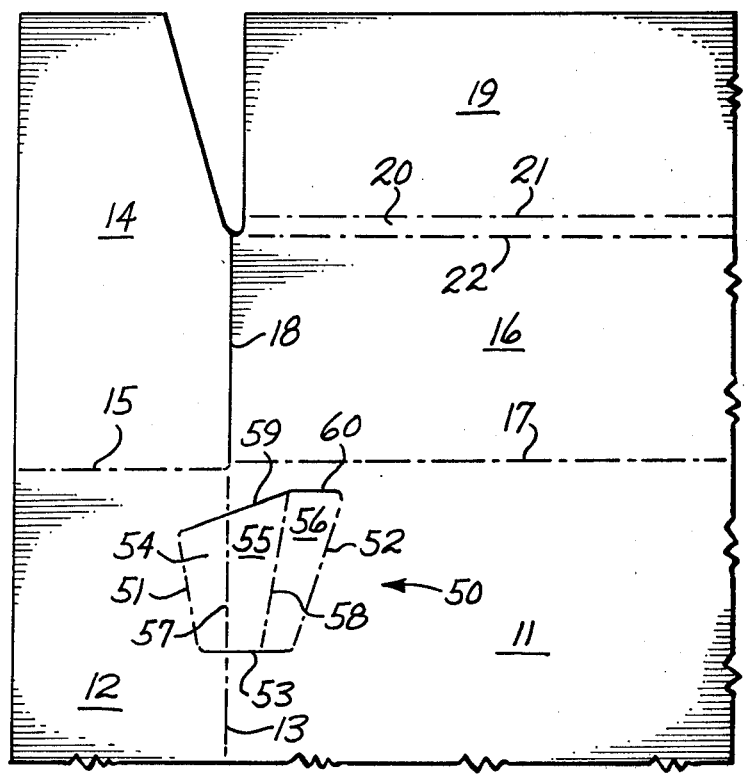
*Fig.*6
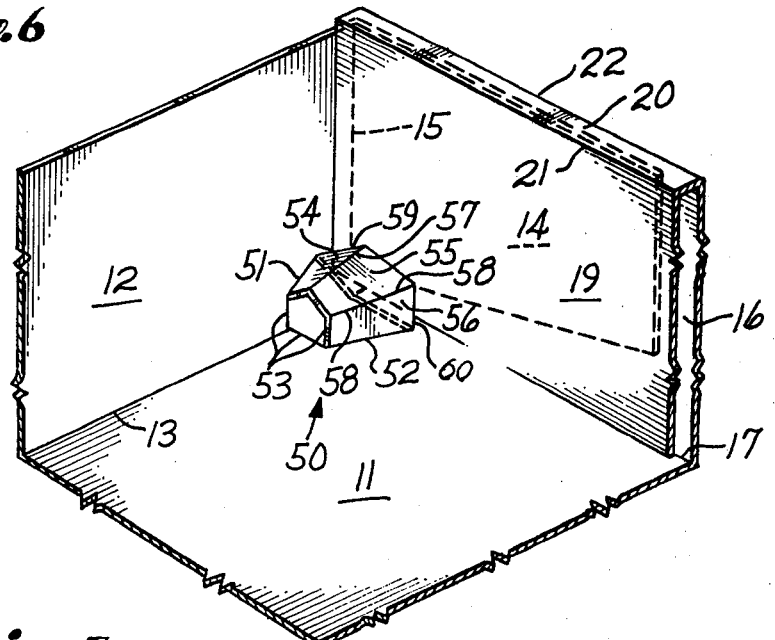
*Fig.*7

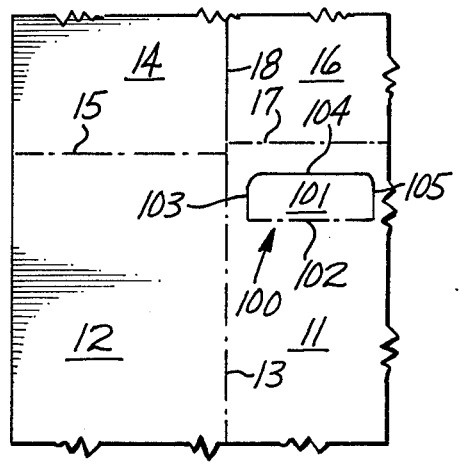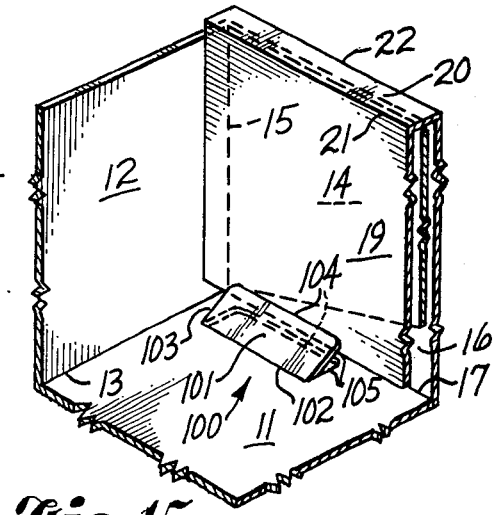
*Fig. 14*  *Fig. 15*
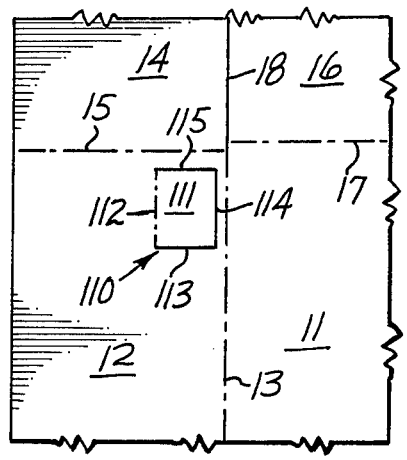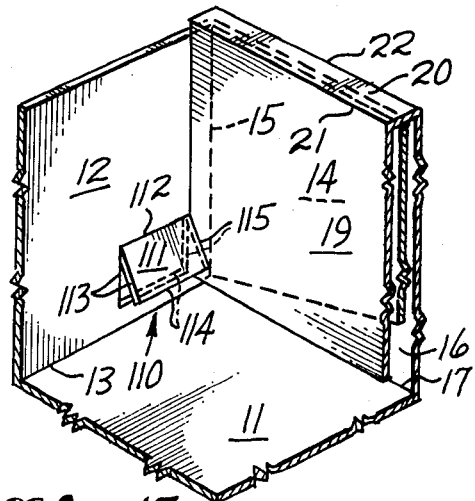
*Fig. 16*  *Fig. 17*

SELF-UNLOCKING CONTAINER CLOSURE

BACKGROUND OF THE INVENTION

1. Field of the Invention

A container closure.

2. Other Art

FIG. 8 of Booth, U.S. Pat. No. 3,904,105 shows a typical closure for a container in which the front and rear walls 110, 112 have end flaps 106, 108, 116, 118. The side walls 120, 122 wrap around these latter flaps and the tabs 128, 130 extend through apertures 134, 136 to lock the elements in place.

The closure disclosed in FIG. 8 of the Booth patent is not considered to be reusable. The problem with this type of closure is that the tolerances are close and the closure is difficult to unlock and flatten after use. The closure is usually damaged when it is unlocked and flattened, reducing its value for resuse or reducing the number of times it may be reused. Repair is often required. It also takes time to unlock and flatten the closure without damage. Often the closures are not flattened but returned in their upright condition. This also causes damage to the closures and wastes space in the transportation of the closures for reuse. These all increase the cost of reuse.

SUMMARY OF THE INVENTION

The inventor wished to make a container or hamper closure in which the various members were formed and locked into place by hand and which could after use easily be flattened and returned for reuse.

The inventor decided there must be a way to prevent damage to the closures and to make it easier to flatten them for return and reuse. In reviewing the overall design of the closure and the container, he considered the fact that the closure telescoped around the sides of the container and fit on the top or bottom edge of the container. He then realized that the container itself acted as a locking mechanism for the closure once the closure was in place on the container. He decided that the closure did not need locking elements that locked the members in place continuously during use, but only locking elements that locked the members in place temporarily until the closure was placed on the container and the container took over the locking function. He also decided that the locking elements on the closure should automatically unlock when the closure is placed on the container. This would allow the closure to flatten automatically when it is removed from the container.

He then devised elements which extend inwardly of the upright closure and hold the side and end panels in upright position. These elements are pushed back into the plane of the closure center and side panels when the closure is placed on the container. The closure members are then locked in place by the container. When the closure is taken from the container, the closure members are not locked in place and the closure automatically springs open and flattens without damage to it. It may be reused many times.

BRIEF DESCRIPTION OF THE DRAWINGS

FIGS. 6 and 7 show a second modification of the temporary locking element, FIG. 6 showing the closure blank and FIG. 7 showing the upright closure.

FIGS. 14 and 15 show a sixth modification of the temporary locking element, FIG. 14 showing the closure blank and FIG. 15 showing the upright closure.

FIGS. 16 and 17 show a seventh modification of the temporary locking element, FIG. 16 showing the closure blank and FIG. 17 showing the upright closure.

DESCRIPTION OF THE PREFERRED EMBODIMENTS

Figure 1:
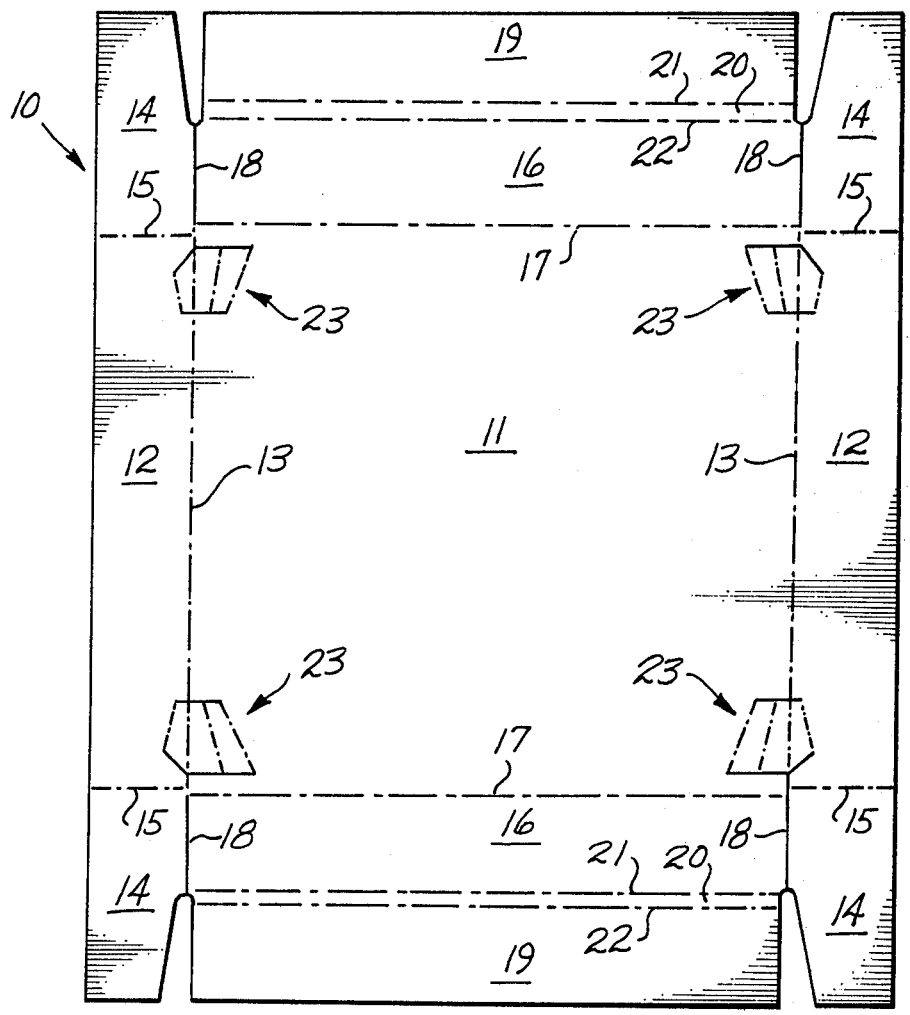
FIG. 1 is a top plan view of a closure blank showing the location of the temporary locking element.

Blank 10 has a central panel 11. Side panels 12 are connected to opposite side edges of the central panel 11 by score lines 13. Locking panels 14 are attached to each end of each side panel 12 by score line 15. Outer end panels 16 are attached to the opposite ends of central panel 11 by score lines 17. Score lines 15 are substantially aligned with but offset inwardly of score line 17 the distance of one thickness of the double-faced corrugated board forming the closure. Slits 18 separate the end panels 16 from the locking panels 14. These may be slots. Inner end panel 19 is attached to the outer edge of outer end panel 16 by connecting panel 20 and inner and outer score lines 21 and 22. The temporary locking elements 23 are in each corner of the central panel 11.

In the following description of the temporary locking elements, the terms "inner," "outer," "inwardly" and "outwardly" are used. The term "inner" refers to the end of the locking element that is remote from the nearest score lines 15 and 17, and the term "outer" refers to the end of the locking element that is nearer to the nearest score lines 15 and 17. The terms "inwardly" and "outwardly" refer to the angular direction, from the inner to the outer end of the locking element, of the side and central score lines of the locking elements. The term "outwardly" refers to a direction toward the outer edge of the nearest side panel 12, and the term "inwardly" refers to a direction away from the outer edge of the nearest side panel 12.

Figure 2:
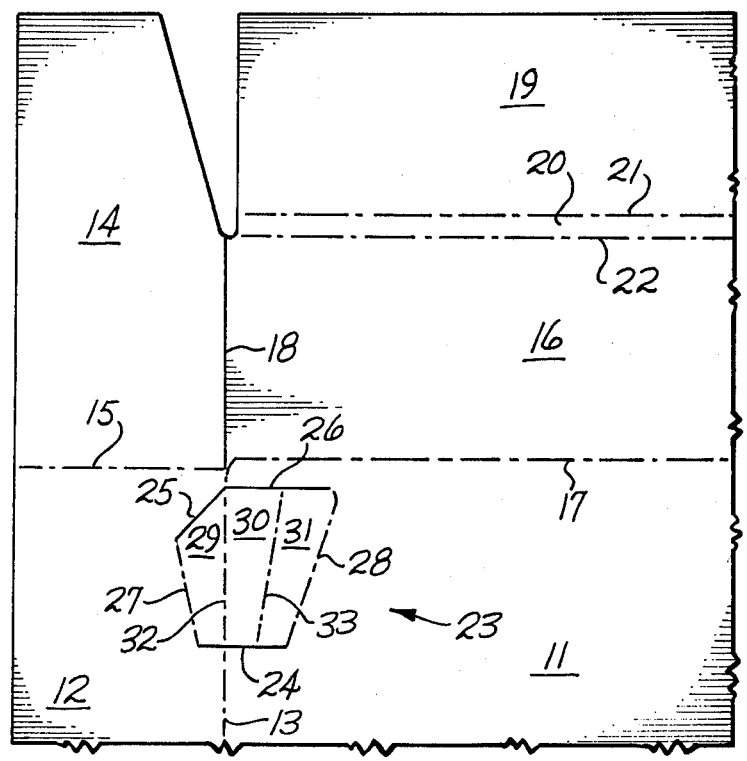
FIG. 2 is a top plan view of a corner of the closure blank showing the temporary locking element in greater detail.

The temporary locking elements are best shown in FIG. 2. The temporary locking element 23 is attached to the side panel 12 by score line 27 and to the central panel 11 by score line 28. It is also defined by the slit 24 extending between the inner ends of score lines 27 and 28, the slit 25 extending obliquely toward the score line 17 from the outer end of score line 27 to the score line 13 and the slit 26 extending from the intersection of slit 25 and score line 13 to the outer end of score line 28. The slit 25 is at an angle to prevent binding of the temporary locking element when it is pushed into position and later unlocked. The slit 26 is parallel to score line 17 and spaced from it a distance equal to three widths of the corrugated board forming the closure. The temporary locking element 23 is divided into three panels 29, 30 and 31 by score lines 32 and 33. It is fan shaped. Score line 32 is coextensive with score line 13. Score line 27 extends obliquely outwardly. Score lines 28 and 33 extend obliquely inwardly. All the score lines would, if extended, meet at a common point on score line 13.

Figure 3:
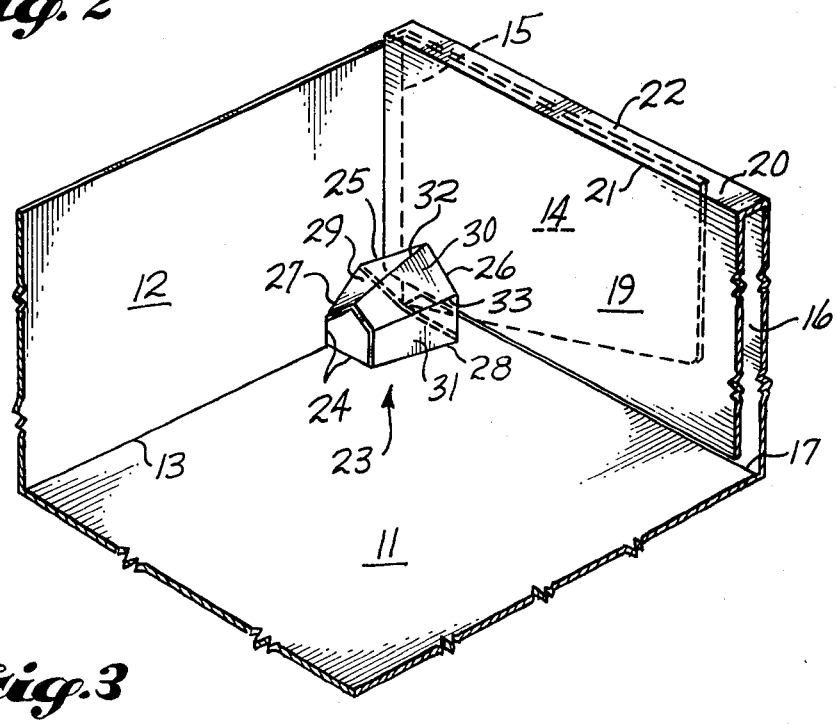
FIG. 3 is an isometric view of the upright container closure showing the temporary locking element in place.

The upright closure is shown in FIG. 3. It is formed by bending the side panels 12 upwardly around score lines 13 and bending the locking panels 14 inwardly around score lines 15 until they are aligned with and just inside score lines 17. The outer end panels 16 are then bent upwardly around score lines 17; connecting panels 20 are bent over the outer edges of locking panels 14 and inner end panels 19 are bent downwardly around locking panels 14. Each of the temporary locking elements 23 is then pushed inwardly of the closure until its edge, defined by slit 26, bears against the inner face of adjacent inner end panel 19. This holds the inner end panel 19 in place locking the closure members in upright position.

When the closure is placed over the container, the top or bottom edge of the container pushes the panels 29, 30 and 31 back into the plane of central panel 11 and side panels 12. When the closure is later removed from the container, there is nothing restraining or holding the inner end panel 19 in place so it will spring outwardly, unlocking the closure members and allowing the closure to be flattened and returned for reuse.

Figure 4:
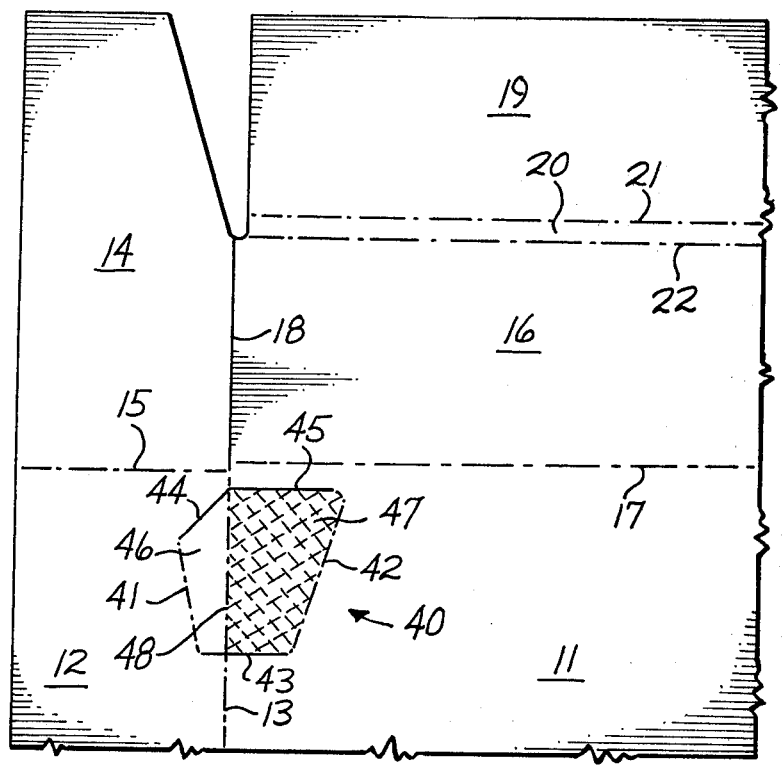
FIGS. 4 and 5 show a first modification of the temporary locking element, FIG. 4 showing the closure blank and FIG. 5 showing the upright closure.
Figure 5:
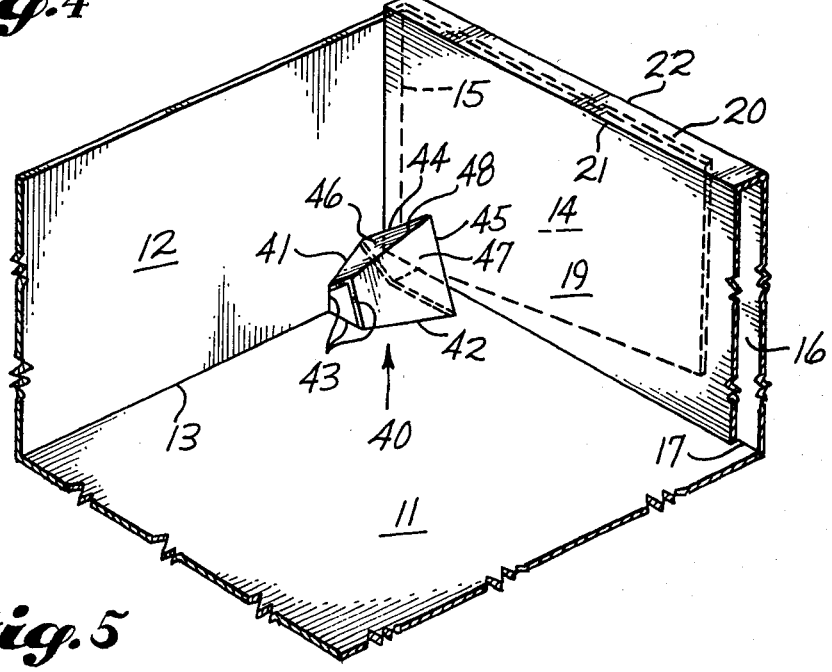

A first modification of the temporary locking element is shown in FIGS. 4 and 5. The reference numerals of the main closure members are the same as those in FIGS. 1–3. The reference numerals for the temporary locking element are different. The temporary locking element 40 is hinged to the side panel 12 by score line 41 and to the central panel 11 by score line 42. The score line 41 extends obliquely outwardly and the score line 42 extends obliquely inwardly. Both score lines would, if extended, meet at a point on score line 13. It is also defined by the slit 43 extending between the inner ends of score lines 41 and 42, the slit 44 extending obliquely toward score line 17 from the outer end of score line 41 to the score line 13, and the slit 45 extending from the intersection of slit 44 and score line 13 to the outer end of score line 42. The slit 45 is parallel to the score line 17 and spaced from the score line 17 a distance equal to three thicknesses of the double-faced corrugated board forming the closure. The temporary locking element 40 is divided into two panels 46 and 47 by a score line 48 which is aligned with score line 13. The panel 47 has been crushed, allowing it to be bent in and out of place more easily.

The closure is locked and unlocked in the same manner as the closure of FIG. 1–3.

A second modification is shown in FIGS. 6–7. Again, except for the temporary locking element the reference numerals in FIGS. 6 and 7 are the same as those in FIGS. 1–3. The principal difference between the temporary locking element 50 in FIGS. 6 and 7 and the temporary locking element 23 in FIGS. 1–3 is that the locking edge has been relieved so that there is less binding during locking and unlocking. The temporary locking element 50 is hinged to the side panel 12 by score line 51 and to the central panel 11 by score line 52. A slit 53 extends between the inner ends of score line 51 and 52. The temporary member 50 is divided into panels 54, 55 and 56 by score lines 57 and 58. It also is fan shaped and the shape of the panels in element 50 are the same as that in element 23. The score line 57 is in line with score line 13. The score line 51 is angled outwardly and the score lines 52 and 58 are angled inwardly. All four score lines 51, 52, 57 and 58 would, if extended, meet in a point on score line 13. The difference is that the outer edge parallel to score line 17, spaced from it three thicknesses of corrugated board and defined by slit 60 extends only across panel 56 between the outer edge of score line 58 and score line 52. The slit 59 extends obliquely toward score line 17 from the outer end of score line 51 to the outer end of score line 58.

The closure locks and unlocks in the same way as the other modifications, the edge defined by slit 60 bearing against the inner face of panel 19.

In each of the above styles of temporary locking element, one of the slits forming the outer edge of the element extends obliquely to prevent binding of the element as it is locked and unlocked. The outer edge in these elements may be completely parallel to the score line 17. This is illustrated in the next modification.

Figure 8:
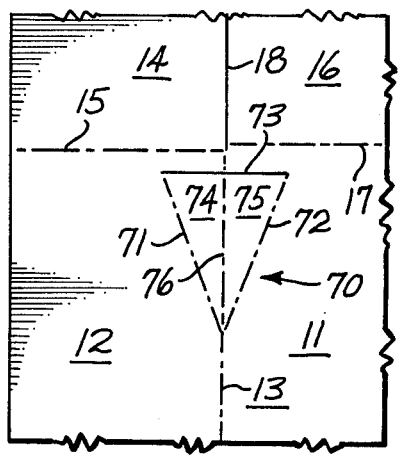
FIGS. 8 and 9 show a third modification of the temporary locking element, FIG. 8 showing the closure blank and FIG. 9 showing the upright closure.
Figure 9:
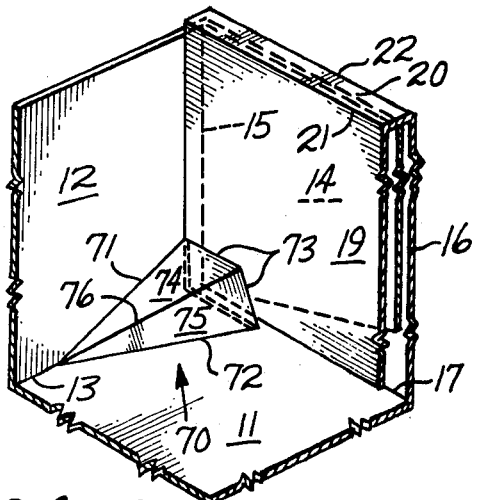

FIGS. 8 and 9 show a third modification. The temporary locking element 70 is triangular and is hinged to side wall 12 by score line 71 and to central panel 11 by score line 72. A slit 73 parellel to score line 17 and spaced from it three thicknesses of corrugated board extends between the outer ends of score lines 71 and 72. The score lines 71 and 72 meet at a point on score line 13. The element 70 is divided into two triangular panels 74 and 75 by a score line 76 which is aligned with score line 13. Again, the closure is formed, locked in position and unlocked in the same manner as the other closures. The edge defined by slit 73 is against the inner face of panel 19.

Figure 10:
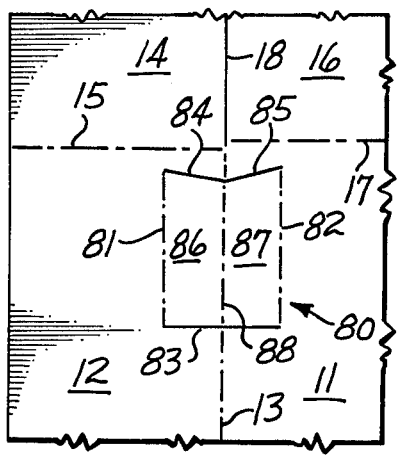
FIGS. 10 and 11 show a fourth modification of the temporary locking element, FIG. 10 showing the closure blank and FIG. 11 showing the upright closure.
Figure 11:
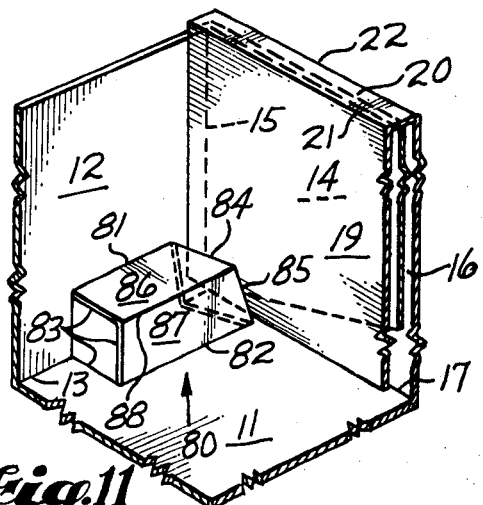

FIGS. 10 and 11 are directed to a fourth modification to reduce binding between the temporary locking element and panel 19. The temporary locking element 80 is attached to side panel 12 by score line 81 and to central panel 11 by score line 82. The score lines 81 and 82 are parallel to score line 13. They could, if desired, extend obliquely inwardly and outwardly either meeting directly at a point on line 13 or, if extended, meeting at a point on line 13. A slit 83 extends between the inner ends of score lines 81 and 82. Slits 84 and 85 extend from the outer ends of score lines 81 and 82, respectively, and meet at score line 13. Their point of intersection is inwardly of the outer ends of score lines 81 and 82, and the only contact between the temporary locking element 80 and the inner face of panel 19 are the points formed by the intersection of slit 84 and score line 81, and slit 85 and score line 82. The member 80 is divided into two panels 86 and 87 by central score line 88 which is aligned with score line 13. Again, the closure is locked and unlocked in the same manner as the other closures.

Figure 12:
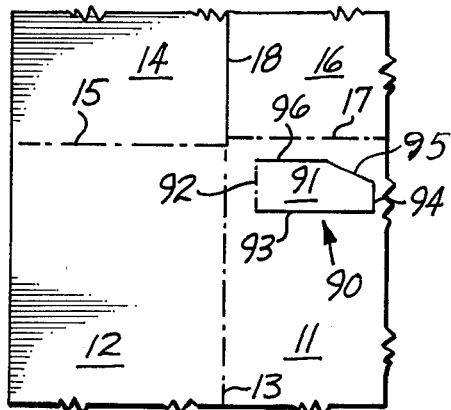
FIGS. 12 and 13 show a fifth modification of the temporary locking element, FIG. 12 showing the closure blank and FIG. 13 showing the upright closure.
Figure 13:
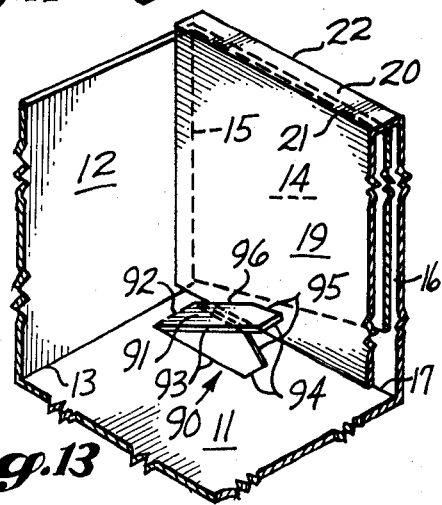

FIGS. 12 and 13 are directed to a different type of temporary locking element. The locking element 90 is a flap 91 which is hingedly attached to central panel 11 by a score line 92 parallel to score line 13. The flap 91 is formed from the panel 11 by slit 93 parallel to score line 17, slit 94 transverse of score line 17, oblique slit 95 and slit 96 which is also parallel to the score line 17 and spaced from score line 17 a distance equal to three thicknesses of the corrugated board. When the side and end panels are placed in upright position, the tab 91 is pushed inwardly and the edge formed by slit 96 bears against the inner face of inner end panel 19. The slit 95 forms a relief section in the tab 91. When the closure is placed over the container, the container upper or lower edge pushes the tabs 91 back into the plane of central panel 11.

FIGS. 14 and 15 show a similar temporary locking element. In this the locking element 100 is a tab 101 which is hinged to the central panel 11 by a score line 102 which is parallel to score line 17. The tab is formed from the central panel 11 by slits 103 and 105, transverse to the score line 17, and slot 104, parallel to the score line 17 and spaced from the score line 17 a distance slightly less than three thicknesses of the corrugated board. Again, when the side and end panels are placed in upright position, the tab 101 is pushed inwardly and the outer edge of the tab, defined by slit 104, bears against the inner face of inner end panel 19. When the closure is placed on the container, the upper or lower edge of the container forces the tab 101 back into the plane of central panel 11. This construction may also be placed in the side panels 12.

FIGS. 16 and 17 show another modification. The temporary locking element 110 is formed in the side wall 12. In the modification shown, the element 110 is a flap 111 which is hinged to the side wall 12 along score line 112. Slits 113, 114 and 115 form the flap from the side wall. The slit 114 is nearer the score line 13 than the score line 112. The slit 115 is parallel to score line 17. When the side and end panels are upright, the flap 111 is pushed inwardly and the edge formed by slit 115 bears against the inner face of inner end panel 19. When the closure is placed over the container, the container upper or lower edge forces the flap 111 backwardly around score line 112 into the plane of side wall 12 releasing the lock.

The closure is made of double faced corrugated and may be used as a top or bottom closure.

I claim:

1. A blank for a container closure comprising
a central panel,
side panels connected to opposite sides of said central panels by first score lines,
locking panels connected to each side of each side panel by second score lines,
outer end panels connected to opposite ends of said central panel by third score lines,
said second score lines being inset from said third score lines a distance substantially equal to the thickness of said locking panels,
connecting panels connected to the outer ends of said outer end panels by fourth score lines,
inner end panels connected to the outer ends of said connecting panels by fifth score lines,
said connecting panels having a width substantially equal to the thickness of said locking panels,
said outer end panel, said connecting panel and said inner end panel being wrapped around said locking panels when said side and end walls are held upright with respect to said central panel,
means for temporarily locking said end walls in wrapped position around said locking panels, said locking means being formed in and hingedly joined to said central and said side panels and having a free edge adjacent to a plane passing through said third score line, said plane being perpendicular to said central panel, said adjacent free edge having at least one first point spaced from said plane a distance such that said first point will bear against an inner face of said inner end panel when said end panels are wrapped around said locking panels,
said temporary locking means being formed in said central and side panels by a pair of slits extending transversely of said first score lines, and hinged to said central and side panels by sixth and seventh score lines,
said sixth score line being in said side panel and said seventh score line being in said central panel,
any second point on said seventh score line being a greater perpendicular distance from said first score line than a corresponding third point on said sixth score line,
said temporary locking means being divided into a first locking means section in said side panel and a second locking means section in said central panel by an eighth score line, said eighth score line being aligned with said first score line,
said sixth, seventh and eighth score lines if extended meeting in a common fourth point,
said locking means being moveable back into the planes of the panels from which it is formed when said closure is telescoped on a container.

2. The blank of claim 1 in which said adjacent free edge extends from one of said sixth or seventh score lines to said eighth score line and is parallel to said third score line and said first point is on this portion of said free edge.

3. The blank of claim 1 in which said second locking means section is divided into elements by a ninth score line.

4. The blank of claim 3 in which said adjacent free edge extends from one of said sixth or seventh score lines to one of said eighth or ninth score lines and is parallel to said third score line and said one point is on this portion of said free edge.

* * * * *